United States Patent
Zilberfarb et al.

(10) Patent No.: US 6,205,329 B1
(45) Date of Patent: Mar. 20, 2001

(54) CALL SET-UP FOR FIXED WIRELESS COMMUNICATIONS SYSTEM

(75) Inventors: Yossi Zilberfarb, Tel Aviv; Shamay Altman, Hod Hasharon, both of (IL); Larry D. Svec, Wauconda, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/973,881
(22) PCT Filed: May 7, 1997
(86) PCT No.: PCT/IB97/00514
  § 371 Date: Apr. 15, 1998
  § 102(e) Date: Apr. 15, 1998
(87) PCT Pub. No.: WO95/15664
  PCT Pub. Date: Jun. 8, 1995

(30) Foreign Application Priority Data

May 9, 1996 (GB) .................................. 9609692

(51) Int. Cl.[7] ............................. H04Q 7/32; H04Q 7/24
(52) U.S. Cl. .......................... 455/426; 455/554; 455/552; 455/445; 455/560
(58) Field of Search .................................... 455/426, 516, 455/554, 552, 445, 560, 422, 564, 467

(56) References Cited

U.S. PATENT DOCUMENTS

| | | | |
|---|---|---|---|
| 5,526,403 | * | 6/1996 | Tam ...................................... 455/426 |
| 5,771,465 | * | 6/1998 | Bojeryd ................................ 455/554 |
| 5,924,030 | * | 7/1999 | Rautiola et al. ...................... 455/426 |

* cited by examiner

Primary Examiner—Daniel S. Hunter
Assistant Examiner—Alan Gantt
(74) Attorney, Agent, or Firm—Heather L. Creps

(57) ABSTRACT

A fixed wireless communication system (100) is a hybrid of a fixed wire-line telephone system and a conventional cellular radio system. In particular, this fixed wireless telephone system (100) provides an instant communication link between a user's fixed wireless terminal (101) and a wire line communication system (105), allowing a user to dial another user's number, as well as, receive call progress tones such as the dial tone. This link is established by detecting (403) an off hook signal at the communication device, transmitting (405) a call set up request with a "ghost" telephone number over the conventional cellular system, and recognizing (411) the "ghost" telephone number, requesting (413), responsive thereto, an audio link on the wire line communication system (105), and linking (415) the audio link on the wire line communication system with the first communication device over the conventional cellular radio communication system.

7 Claims, 4 Drawing Sheets

CALL SET-UP FOR FIXED WIRELESS COMMUNICATIONS SYSTEM

FIELD OF THE INVENTION

Generally, the present invention relates to communication systems and more particularly to a communication system including a radio communication system and a wire line communication system acting as a fixed wireless communication system.

BACKGROUND OF THE INVENTION

Generally, a fixed wireless telephone service is used as an alternative to wire line telephone service in rural or urban settings, particularly in developing countries. One way of providing a fixed wireless telephone service is to use a conventional cellular telephone system and couple it with a wire line telephone system to provide wireless service to fixed terminals throughout a geographic area.

There are obvious differences between a conventional cellular telephone system and a conventional wire line telephone system. For example, in a wire line telephone system, upon detection of the off hook condition in the communication device an audio line is directly coupled between a wire line telephone switch and the user's communication device. This audio line provides instant dialing services for the user and provides dial tone feedback to the user indicating service is available. In a conventional cellular system, a phone number is dialled and then an indicator or send button is depressed to transmit a message indicating to a central base station that a call or communication is desired. After a certain amount of delay a communication channel is allocated to the user and is routed directly to the dialed number. No direct dialing on the communication channel is allowed and the system does not provide dial tone feed back.

In order to provide a fixed wireless telephone service, it is desirable to emulate the service of a fixed wire line telephone service. Specifically, it would be advantageous to provide dial tone feedback and immediate connection to a telephone switch upon transmitting an off hook signal from a communication unit in a fixed wireless telephone system.

SUMMARY OF THE INVENTION

A first aspect of the present invention provides a method of call setup for use in a communication system including a radio communication system and a wireline communication system, the method comprising the steps of detecting an off-hook condition at a first communication device; transmitting, responsive to said step of detecting, a predetermined digital bit stream using the radio communication system; recognizing the predetermined digital bit stream as a request for communication services; requesting, responsive to said step of recognizing, an audio link on the wireline communication system; and linking the audio link on the wireline communication system with the first communication device over the radio communication system, thereby forming a communication link between the first communication device and the wireline communication system allowing a user to dial a desired communication number.

A second aspect of the present invention provides a call setup apparatus for use in communication system including a radio communication sytem and a wireline communication system, the call setup apparatus comprising: a detector for detecting an off-hook signal at a first communication device; a radio transmitter, responsive to said detector, for transmitting a predetermined digital bit stream over the radio communication system; a radio receiver for receiving the predetermined digital bit stream; a controller comprising: means for recognizing the predetermined digital bit stream as a request for service; means, responsive to the means for recognizing, for requesting an audiolink on the wireline communication system, and linking the audiolink with the first communication device thereby allowing a user to dial a desired communication number.

DETAILED DESCRIPTION OF A PREFERRED EMBODIMENT

The preferred embodiment includes a description of a fixed wireless system that is a hybrid of a fixed wire-line telephone system and a conventional cellular radio system. It is intended as an alternative to wire line telephone system in rural or urban settings, particularly in developing countries. A fixed wireless telephone system saves the tremendous cost of providing the infrastructure required for a wire line telephone system and allows rapid installation of the service. In particular, this fixed wireless telephone system provides an instant communication link between a user's fixed wireless terminal and a wire line communication system, allowing a user to dial another user's number, as well as, receive call progress tones such as the dial tone. This link is established by detecting an off hook signal at the communication device, transmitting a call set up request with a "ghost" telephone number over the conventional cellular system, and detecting the ghost telephone number, requesting, responsive thereto, an audio link on the wire line communication system, and linking the audio link on the wire line communication system with the first communication device over the conventional cellular radio communication system. When modifying the conventional cellular system in the above manner, the user is provided with an instant link between the wire line communication system and a communication device in the fixed wireless telephone service, thus emulating a traditional wire line communication system.

Figure 1:
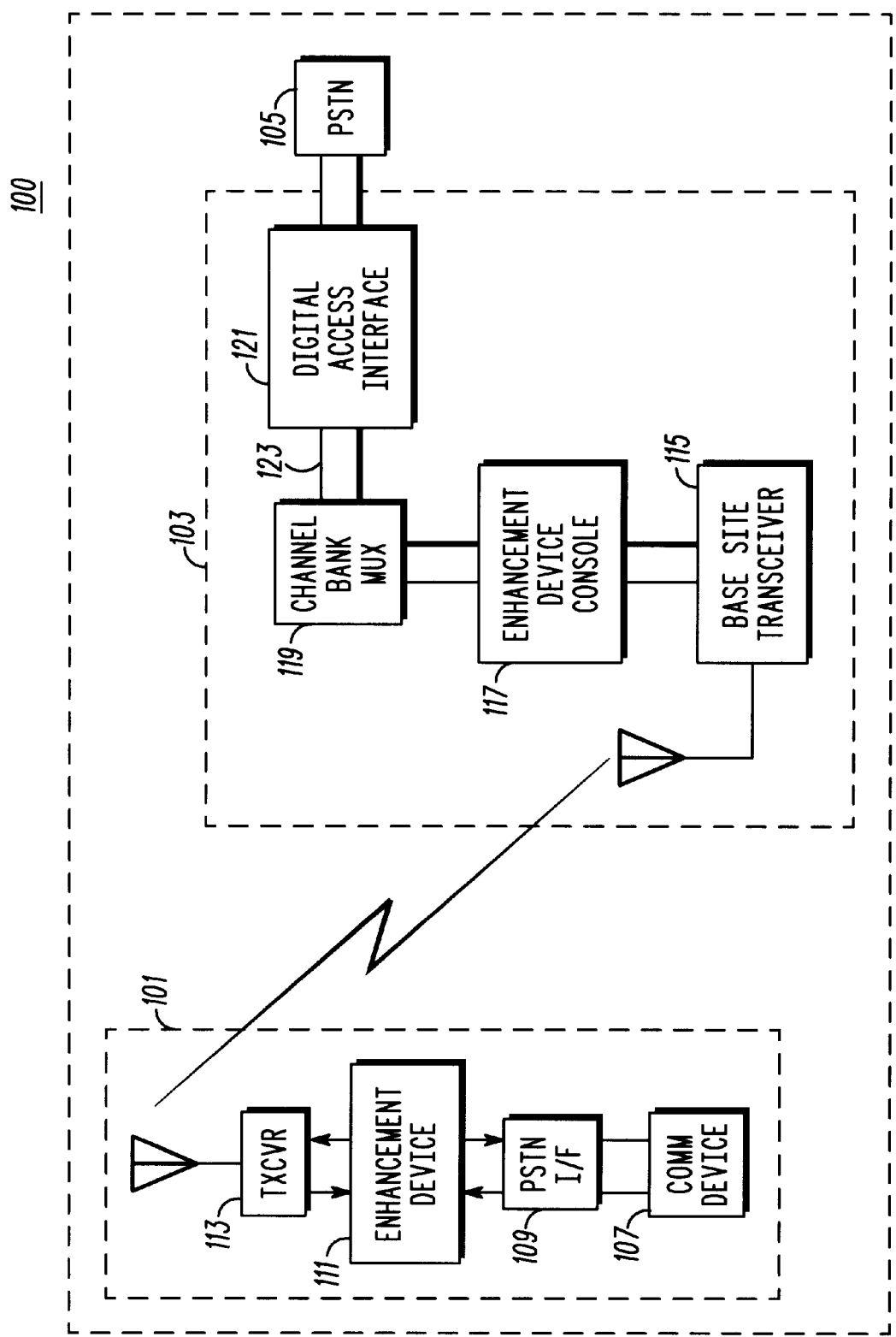
FIG. 1 is an illustration of a fixed wireless telephone service incorporating a conventional cellular telephone system and a conventional wire line telephone system in accordance with the present invention.

FIG. 1 is an illustration of a fixed wireless communication system 100 including a fixed wireless terminal 101, a fixed wireless base station 103 and a conventional wire line switch 105. The fixed wireless terminal (FWT) 101 includes a traditional wire line communication device 107 such as a modem, a telephone or a fax machine. The fixed wireless terminal 101 additionally includes a PSTN interface 109, an enhancement device 111 and a cellular radio telephone transceiver 113.

The communication device 107 is any traditional wire line communication device such as a telephone, a fax machine or a modem. The communication device 107 is coupled to the PSTN interface via a traditional two-wire connection as is known in wire line communication systems. The PSTN interface 109 provides a traditional interface to a communication device such that the end user is not aware of any difference between a fixed wireless communication system and a fixed wire line communication system. Additionally, the PSTN interface detects traditional signalling created by the communication device 107, such as an off hook signal, an on hook signal and a switch hook signal. The PSTN interface 109 transmits the analogue audio between the communication device 107 and the enhancement device 111. Additionally, the PSTN interface 109 transmits the detected standard communication device signals (on hook, off hook, switch hook) to the enhancement device 111 and communicates any standard wire line signals such as an incoming call signal, a metering pulse or an end of call signal from the enhancement device to the communication device 107.

The enhancement device 111 digitises the audio received from the PSTN interface 109 and transmits it to a standard cellular radio telephone system transceiver 113. Likewise, the audio received from the transceiver 113 is converted to analogue audio signals. Likewise, the enhancement device 111 converts the digital audio received from the transceiver 113 to analogue audio and is output to the PSTN interface 109. Additionally, the enhancement device 111 provides the necessary enhancement for operating the traditional cellular transceiver 113 in a fixed wireless telephone environment. Specifically, in response to receiving an original off hook signal from the PSTN interface 109, the enhancement device requests a communication channel on the conventional cellular radio communication system by transmitting a predetermined digital sequence to the transceiver 113. In the preferred embodiment this predetermined digital sequence is a "ghost" telephone number. The specific details of this request are described below. Additionally, the enhancement device 111 codes and decodes traditional wire line signals, such as on hook, off hook, flash hook, metering pulse and end of communication signals.

The transceiver 113 is a standard cellular radio telephone system transceiver. In a preferred embodiment, the transceiver is developed to meet the TACS analogue cellular radio telephone system. However, it is envisioned that any other traditional cellular radio telephone communication system could be substituted therefor including analogue and digital cellular systems. The transceiver 113 transmits and receives radio frequency "RF" signals to and from a base site transceiver 115 located in the fixed wireless base station 103. The base site transceiver 115 is comparable with the radio transceiver 113 of the fixed wireless terminal 101. The base site transceiver 115 sends and receives digital audio signals to and from an enhancement device console 117. The enhancement device console 117 contains a plurality of enhancement devices earlier described in relation to the fixed wireless terminal 101. Again, the enhancement devices 111 contained in the enhancement device console 117 digitise analogue audio signals transmitted there to pass those digital audio signals on to the base site transceiver 115. Likewise, the enhancement devices 111 contained within the enhancement device console 117 transform received digital audio signals into audio signals for use in the traditional wire line telephone system. Additionally, the enhancement devices contained within the enhancement device console 117 code and decode the signals transmitted between enhancement device 111 of the fixed wireless terminal and enhancement devices in the enhancement device console 117.

The channel bank multiplexer (MUX) 119 is coupled to a digital access interface (DAI) 121 via an E1 trunk 123. The digital access interface 121 may be remotely located from the base site transceiver 115. In the preferred embodiment, the enhancement device console 117 and the channel bank MUX 119 and are coupled using a microwave link. The channel bank MUX 119 converts audio received from the digital access interface 121 into four-way audio which is then transmitted to the enhancement device console 117. Likewise, four-way audio received from the enhancement device console 117 is converted by the channel bank MUX 119 into one trunk and output to the digital access interface 121.

The digital access interface 121 provides a standard trunk level interface such as R2 or SAT, or a proprietary interface to the local central office switch. Thus, the DAI 121 interfaces between the E1 trunk 123 and the public switching telephone network 105. Additionally, the DAI 121 requests audio links on the wire line communication system and links the audio link on the wire line communication system with a communication channel on the conventional cellular radio telephone system, thus providing a link between the communication device 107 and the PSTN 105.

Figure 2:
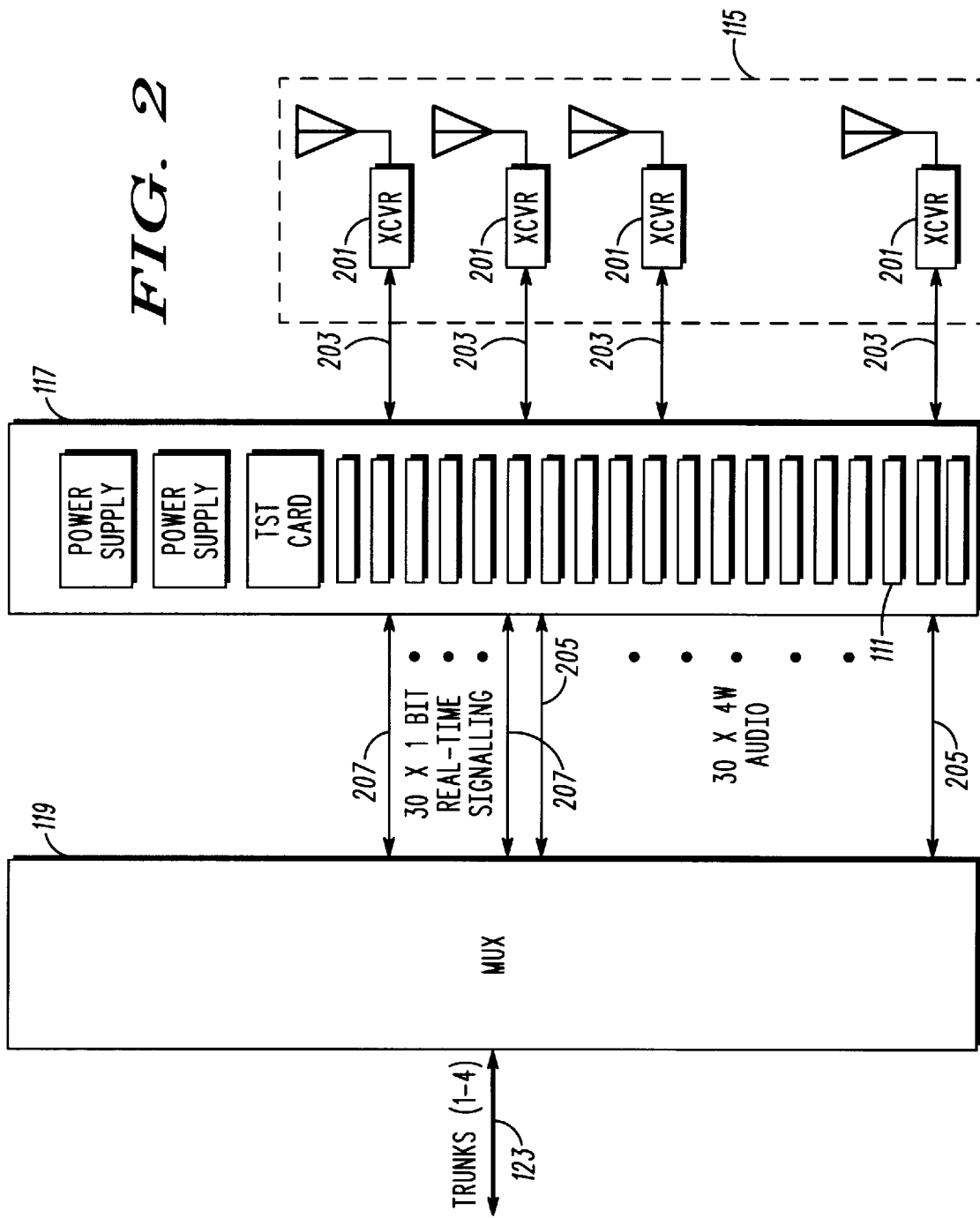
FIG. 2 is a detailed illustration in block diagram form of a base site inter-connection in accordance with the present invention.

FIG. 2 is a detailed illustration in block diagram form of a portion of the fixed wireless base station 103. Specifically, FIG. 2 includes the base site transceiver 115, the enhancement device console 117, the channel bank MUX 119, the E1 interface 123 and the interconnections between these devices. The base site transceiver 115 includes a transceiver 201 for each of the radio communication channels to a fixed wireless communication device such as FWT 101 of FIG. 1. It should be noted that the number of transceivers necessary will vary depending upon the cellular system utilised in this communication system 100. Specifically, if a time division multiple access system is used, then each transceiver could service multiple fixed wireless telephony devices, thus, reducing the number of required transceivers. Each transceiver 201 of the base site transceiver 115 is coupled to the enhancement device console 117 via a four-wire connection 203. Each of the transceivers 201 are coupled to an enhancement device 111 contained within the enhancement device console 117. In the preferred embodiment, up to 30 transceivers and 30 corresponding enhancement devices may be utilised. Each of the enhancement device 111 transmits a four-wire analogue audio signal to and from the channel bank MUX 119 via lines 205. Additionally, the enhancement devices 111 code and decode the real time signalling bits which are used to transmit the traditional wire line signals such as on hook, off hook, flash hook, metering pulses and call termination via the real time signalling connections 207.

Figure 3:
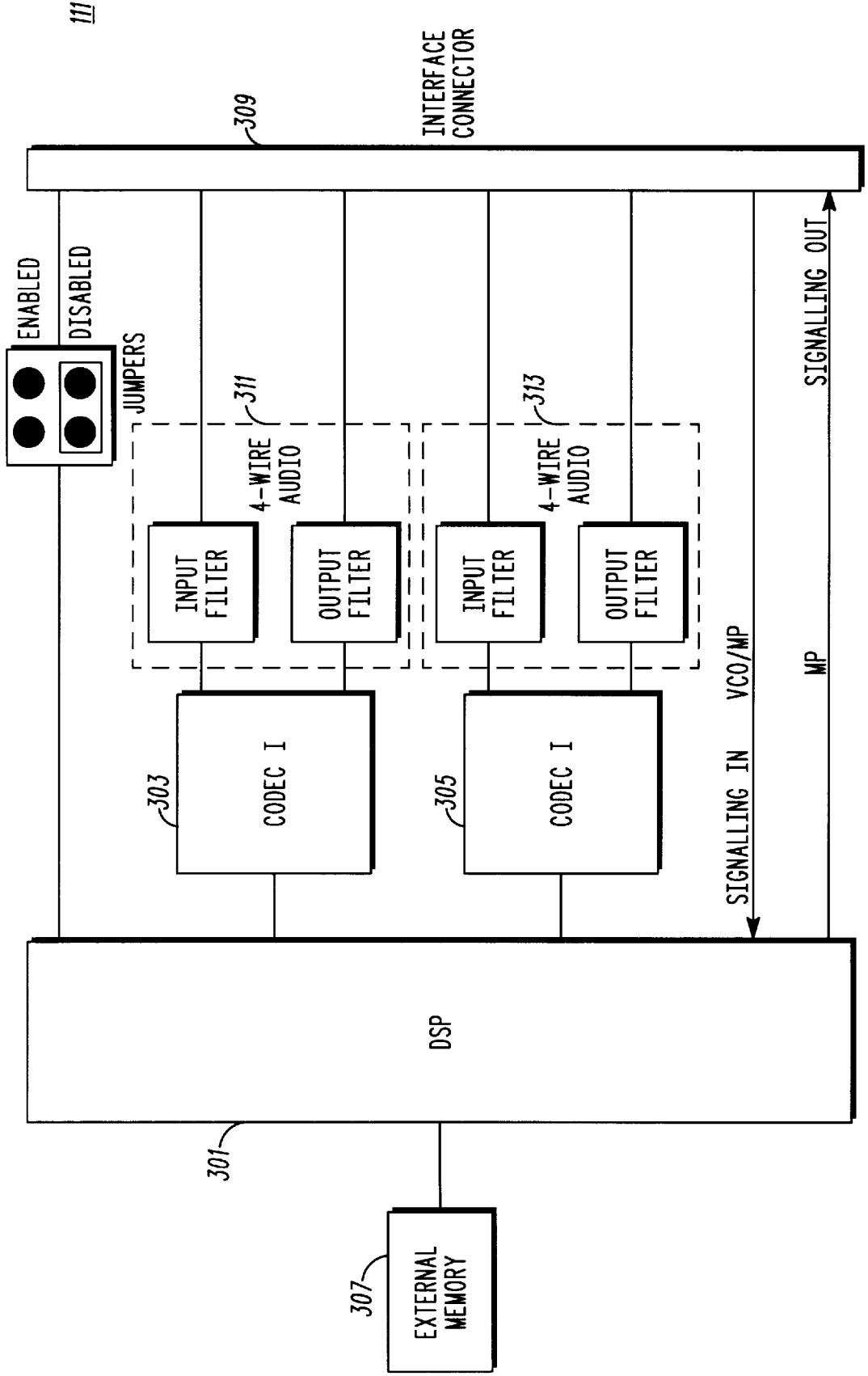
FIG. 3 is an illustration in block diagram form of an enhancement device console in accordance with the present invention.

FIG. 3 is a detailed illustration in block diagram form of a enhancement device 111 of the present invention. The enhancement device includes a DSP 301, a first codec 303, a second codec 305, external memory 307, an interface connector 309, a first set of filters 311 related to the first codec 303 and a second set of filters 313 related to the second codec 305. In the preferred embodiment, the DSP 301 is a 16 bit fixed point DSP operating at 80 megahertz (Mhz). For outgoing audio, the DSP 301 receives a string of binary numbers representing an analog audio signal. It converts this string to a digital stream that represents the actual data or voice recieved from the communication device 107 or from the PSTN 105. It then encodes the voice or data using the first code 303 or the second codec 305, filters the signals using the appropriate set of filters and transmits the encoded data/voice to the interface connector 309. For incoming audio, the DSP 301 performs decodes the data/voice digital signals, converting them back to an analog audio signal, reversing the outgoing audio process previously described. Additionally, the enhancement device 111, encodes and decodes the traditional telephony signals (on hook, off hook, switch hook, metering pulses, call disconnect) on to and off of the audio signals received by and transmitted from the enhancement device 111.

Figure 4:
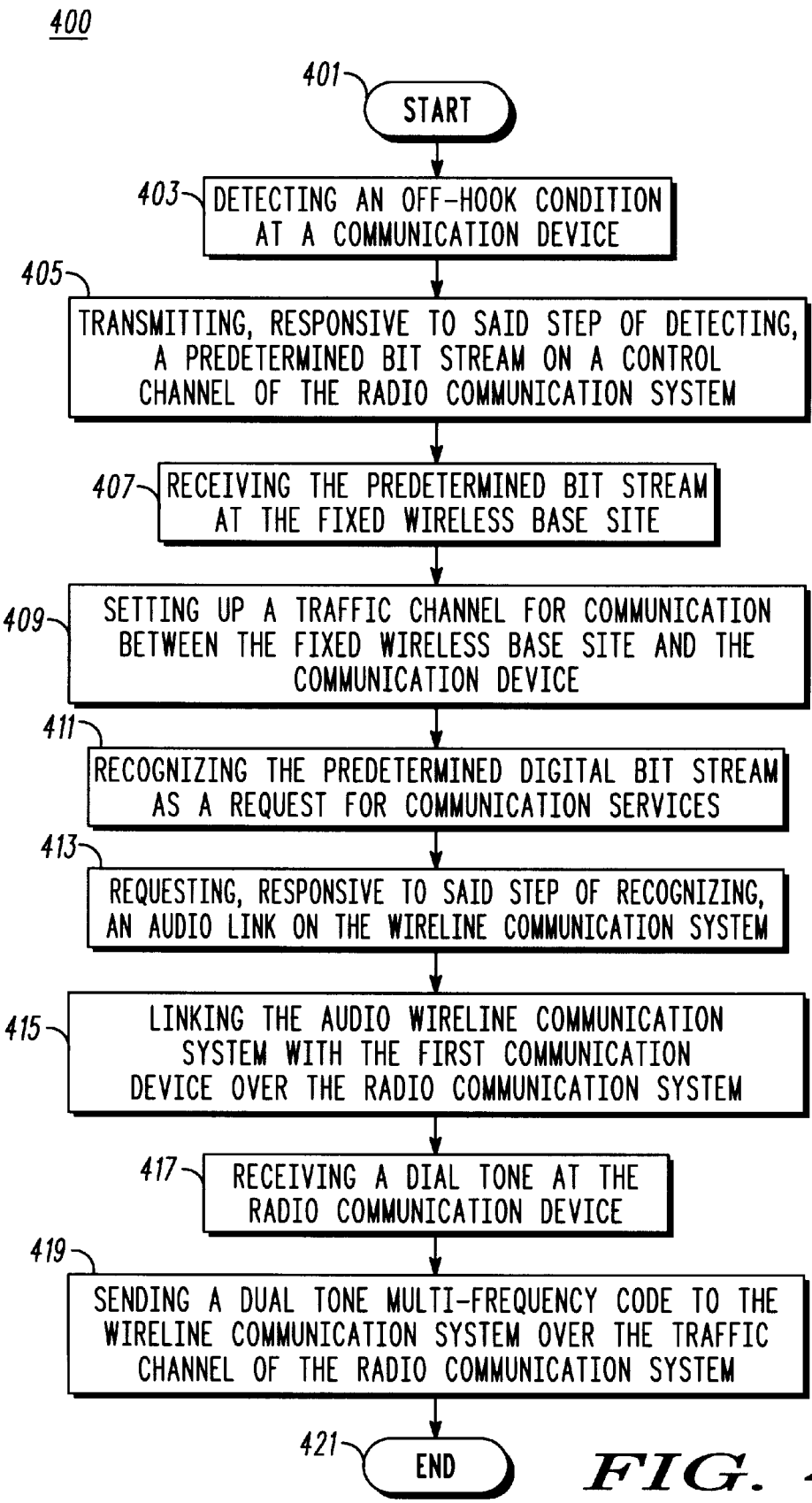
FIG. 4 is an illustration in process flow chart form of a call set up method in accordance with the present invention.

FIG. 4 is an illustration in process flow diagram form of a method 400 of call setup in accordance with the present invention. The method starts at 401. At function block 403, the PSTN interface 109 of FIG. 1 detects an off-hook condition at the communication device 107. At function block 405, the enhancement device 111 of FIG. 1 transmits, responsive to said step of detecting, a predetermined bit stream to the transceiver 113 for transmission on a control channel of the radio communication system. In the preferred embodiment, the predetermined bit stream is a "ghost" telephone number, as previously described. At function block 407, the fixed wireless base site 103 receives the predetermined bit stream. In response to receiving the predetermined bit stream, the fixed wireless base site 103 sets up a traffic channel for communication between the fixed wireless base site 103 and the communication device 107 at function block 409. The predetermined bit stream is then passed on to the DIA 121 within the fixed wireless base site 103. At function block 411, the DIA 121 recognises the predetermined digital bit stream as a request for communication services. At function block 413, the DIA 131 requests, responsive to said step of recognising, an audio link on the wireline communication system 105 of FIG. 1. The DIA 121 then links the audio link on the wireline communication system with the first communication device over the radio communication system, at function block 415. The communication device 107 then receives the dial tone from the wireline communication system, at function block 417, as it would in a wireline communication system. The user then dial a dual tone multi-frequency (DTMF) code to the wireline communication system over the traffic channel of the radio communication system, at function block 419. The method 400 ends at 421.

What is claimed is:

1. A method for setting up a call between a fixed wireless subscriber terminal and a wireline communication network via a wireless transceiver, the method comprising the steps of:

detecting in the fixed wireless subscriber terminal an off-hook condition;

generating, in the fixed wireless subscriber terminal, responsive to said step of detecting, a predetermined telephone number and transmitting the predetermined telephone number, over a wireless link to said wireless transceiver;

recognizing, in said wireless transceiver, the predetermined telephone number as a request for communication services;

requesting in said wireless transceiver, responsive to said step of recognizing, an audio link from the wireline communication network; and, in the wireless transceiver linking the audio link from the wireline communication network with the fixed wireless subscriber terminal, forming a communication link therebetween and thereby allowing a subscriber to dial a desired communication number.

2. The method of claim 1 further comprising the step of retransmitting call progress tones and announcements generated by the wireline communication network to the fixed wireless subscriber terminal.

3. The method of claim 2 wherein the call progress tones include the dial tone.

4. Apparatus for setting up a call between a fixed wireless subscriber terminal and a wireline communication network via a wireless transceiver, the call setup apparatus comprising:

a detector in the fixed wireless subscriber terminal for detecting an off-hook signal;

a radio transmitter in the fixed wireless subscriber terminal, responsive to said detector, for transmitting a predetermined telephone number over;

a wireless link to said wireless transceiver;

an access device in the wireless transceiver comprising:
   means for recognizing the predetermined telephone number as a request for service;
   means, responsive to the means for recognizing, for requesting an audiolink from the wireline communication network, and for
   linking the audiolink with the fixed wireless subscriber terminal thereby allowing a subscriber to dial a desired communication number.

5. An apparatus in accordance with claim 4 further comprising a second transmitter for retransmitting call progress tones and announcements generated by the wireline communication network to the fixed wireless subscriber terminal via the wireless transceiver.

6. The apparatus of claim 5 wherein the call progress tones include the dial tone.

7. The apparatus of claim 4 wherein said wireless transceiver forms a part of an analogue cellular radio communication system.

* * * * *